W. C. GRIMES.
Pressure Gage.
No. 20,848. Patented July 6, 1858.
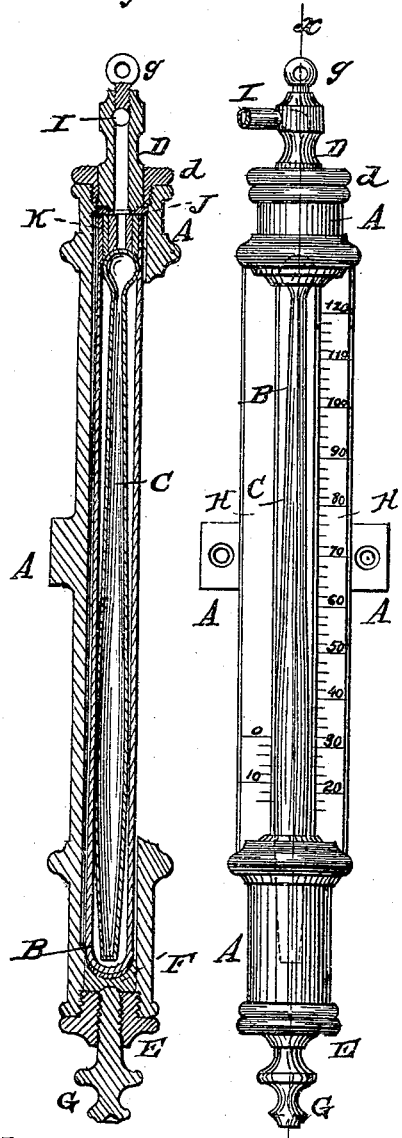

UNITED STATES PATENT OFFICE.

W. C. GRIMES, OF PHILADELPHIA, PENNSYLVANIA, ASSIGNOR TO DAVID MATTHEW, OF SAME PLACE.

GAGE.

Specification of Letters Patent No. 20,848, dated July 6, 1858.

*To all whom it may concern:*

Be it known that I, WM. C. GRIMES, of the city of Philadelphia and State of Pennsylvania, have invented a new and useful Improvement in Pressure-Gages; and I do hereby declare that the following is a full and exact description thereof, reference being had to the accompanying drawings and to the letters of reference marked thereon.

The nature of my invention consists in a certain improvement in the manner of constructing pressure gages, whereby a more accurate, uniform and legible reading scale of units and tens is procured, to be hereinafter more fully explained.

To enable others skilled in the art to make and use my invention I shall proceed to describe its construction and operation reference being had to the accompanying drawings forming part of this specification, in which similar letters in different figures indicate like parts and in which, Figure 1 is side view shown in section through line *x x* Fig. 2. Fig. 2 is front view. Fig. 3 is view of concentric glass B removed. Fig. 4 is view of concentric glass C removed.

A is the case containing concentric glasses.

B is the outer concentric glass, C the inner concentric glass.

D is stop swivel pipe passing through *d*. *d* is upper screw ring screwed into case A.

E is the lower screw ring screwed into A; F is cup ring fitting into A and fitting bottom of glass B containing a piece of gum in it to protect the glass; G is regulating screw, screwed into E with the point coming up against F to make joints on end of glass B; *g* is small screw, screwed into top of D over the hole to charge the glasses with its mercury when all put up and attached; I is connecting pipe screwed into swivel D; H H is reading scale plates on each side of concentric glasses and attached to case A by two small screws and at each end by dovetailing or slots in case A; J is gum ring at the head of the concentric glass B and makes joint between B and D.

K is a gum cushion in B to protect C from moving and shaking having sufficient opening left on one side to admit the mercury and for the passage of fluid or air to operate the gage.

It is a well known fact that in pressure gages when single parallel glass tube or siphon tube is used with mercury to indicate pressure that the reading scale of units and tens becomes so limited with the necessary high pressure as not to leave room on the reading scale to make them legible. To obviate this difficulty in constructing gages and make more uniform and legible reading scale I construct my gage with double concentric glasses, the outer one cylindrical with solid end of sufficient diameter of bore to contain within its bore and ends one of peculiar construction having in view three points: first to make an air globe at its smallest or upper end of sufficient area to give room for compressing air, second more uniform rise of mercury as the air becomes compressed in its body, thirdly contents of the tube to give the desired pressure. The body of this tube is made as large as will freely pass into the bore of the outer tube and its body and bore are tapered both ways from the largest part of the tube which is about ⅕ of its length from its open end, the upper end being tapered so as to give the mercury and air as uniform a rise with the units and tens as possible, while the air is compressed in the bubble, while the lower orifice or opening, is made very small in order to prevent too sudden circulation, see Fig. 4C.

I am well aware that pressure gages with parallel glass tubes and siphon tubes indicating pressure by column of mercury and compressed air, but they have no such effect as mine and I do not wish to be understood as claiming any such arrangement. But What I do claim as my invention and desire to secure by Letters Patent is—

The peculiar construction of mercurial pressure gage, having two concentric glass tubes, so proportioned to each other and the reading scale, as to produce the necessary space to register the units and tens, and make them more uniform and legible substantially as herein set forth.

In testimony whereof I have hereunto set my hand this fourteenth day of May A. D. 1858.

WM. C. GRIMES.

Witnesses:
CHARLES D. FREEMAN,
WM. C. GAW.